(12) United States Patent
Peele, Jr.

(10) Patent No.: US 6,497,351 B1
(45) Date of Patent: Dec. 24, 2002

(54) PROTECTIVE BAG FOR A COUPE TOP AUTOMOBILE

(76) Inventor: John A. Peele, Jr., 148 Hallmark Ave., Hamlet, NC (US) 28345

( * ) Notice: Subject to any disclaimer, the term of this patent is extended or adjusted under 35 U.S.C. 154(b) by 0 days.

(21) Appl. No.: 09/665,140

(22) Filed: Sep. 19, 2000

(51) Int. Cl.$^7$ ................................................. B60R 7/00
(52) U.S. Cl. ........................ 224/563; 224/311; 224/683; 224/236; 150/117; 150/168; 296/136; 383/39; 383/40; 383/41
(58) Field of Search .............................. 224/311, 563, 224/681, 682, 683, 236, 237; 296/218, 219, 136; 150/117, 154, 166, 168; 383/38, 39, 40, 41

(56) References Cited

U.S. PATENT DOCUMENTS

| | | | | |
|---|---|---|---|---|
| 4,467,944 A | * | 8/1984 | Manko et al. | 224/311 |
| 5,193,874 A | * | 3/1993 | German et al. | 206/454 |
| D383,112 S | * | 9/1997 | Patterson | D12/415 |
| 5,779,122 A | * | 7/1998 | Martinelli | 224/222 |
| 5,865,314 A | * | 2/1999 | Jacober | 150/117 |
| 6,199,737 B1 | * | 3/2001 | Ringelstetter | 150/108 |

* cited by examiner

Primary Examiner—Stephen K. Cronin
(74) Attorney, Agent, or Firm—Adams, Schwartz & Evans, P.A.

(57) ABSTRACT

A multi-compartment bag assembly for protecting and storing one or both hardtops of a coupe top automobile, the bag assembly comprising a first bag compartment defined by an overlying first outside compartment wall and an inside compartment wall joined along respective bottom and opposing side edges and including a first top lateral opening adapted for receiving at least one of the hardtops therein, and a second bag compartment defined by the inside compartment wall and a second outside compartment wall, the inside compartment wall and the second outside compartment wall being joined along respective bottom and side edges and including a second top lateral opening adapted for receiving at least one of the hardtops therein.

9 Claims, 12 Drawing Sheets

PROTECTIVE BAG FOR A COUPE TOP AUTOMOBILE

TECHNICAL FIELD AND BACKGROUND OF THE INVENTION

This invention relates to a bag particularly intended to protect one or both of the hardtops of a coupe top automobile or vehicle when those hardtops are not in use. As any coupe top automobile enthusiast will attest, a coupe top automobile ("coupe") or other sports car owner who purchases a vehicle equipped with a removable hardtop typically does not intend to keep the hardtop installed on the vehicle year-round. Upon bringing a new coupe home, the owner will likely be inclined to remove the hardtop as soon as possible and take the vehicle out for a long, breezy test drive. Unfortunately, once removed from the vehicle, the unwieldy hardtop must be stored.

While many coupes include an interior storage compartment, the compartment typically only accommodates one hardtop, and offers no protection to the hardtop from scratches, dents and other damage caused by other objects simultaneously stored within the compartment. Furthermore, some coupes come equipped with both a glass hardtop and a hardtop made of metal or some other opaque substance. Even if there is room inside the compartment for both of the hardtops, they usually cannot be stored together because the surface of the opaque hardtop will likely become scratched, or the glass hardtop will bump the opaque hardtop while the automobile is being driven, and either crack or completely shatter. Under such circumstances, an owner wishing to drive the coupe without using a hardtop must store one of the hardtops in the storage compartment of the coupe and place the other hardtop in an alternate location away from the vehicle. More often than not, the "alternate location" is a high-traffic area such as a garage, where the hardtop is subjected to an increased risk of being damaged.

The invention of the present application addresses the problem of how to effectively store two hardtops simultaneously by providing a protective bag having dual storage compartments. The protective bag may be adapted for use in any coupe top automobile or other vehicle having one or more removable hardtops. The invention uses commonly available materials and components which may be easily and inexpensively manufactured and supplied to the user in many different forms, resulting in a protective bag adapted for being securely anchored within the interior storage compartment of a coupe top automobile or used to store hardtops in an alternate location outside of the automobile. The bag takes advantage of padded dual compartments made of multi-layered, durable material to provide a unique alternative to coupe top vehicle owners who desire multiple options for safely and securely storing removable hardtops.

SUMMARY OF THE INVENTION

Therefore, it is an object of the invention to provide a bag for protecting and storing one or both hardtops of a coupe top vehicle, thereby reducing the risk of damage to the hardtops.

It is another object of the invention to provide a bag which is inexpensive and easy to manufacture from commonly available components.

It is another object of the invention to provide a bag which may be easily removed from the interior storage compartment of a vehicle while the hardtops are stored therein and then moved to an alternate storage location outside of the vehicle.

It is another object of the invention to provide a bag specifically designed to address the unique hardtop storage needs of coupe top automobile owners.

These and other objects of the present invention are achieved in the preferred embodiments disclosed below by providing a multi-compartment bag assembly for protecting and storing one or both hardtops of a coupe top automobile. The bag includes a first bag compartment defined by an overlying first outside compartment wall and an inside compartment wall joined along respective bottom and opposing side edges. The first bag compartment has a first top lateral opening adapted for receiving at least one of the hardtops therein. A second bag compartment is defined by the inside compartment wall and a second outside compartment wall, the inside compartment wall and the second outside compartment wall being joined along respective bottom and side edges. The second bag compartment includes a second top lateral opening adapted for receiving at least one of the hardtops therein.

According to one preferred embodiment of the invention, the bag assembly further includes a first closure flap integrally formed with the inside compartment wall adjacent the first top lateral opening and extending outwardly therefrom between the side edges. The first closure flap includes an inner face adapted for releasably engaging an outer surface of the first outside compartment wall adjacent the first top lateral opening for retaining one of the hardtops within the first bag compartment.

According to another preferred embodiment of the invention, the bag assembly further includes a second closure flap integrally formed with the second outside compartment wall adjacent the second top lateral opening. The second closure flap extends outwardly from the second top lateral opening between the side edges and includes an inner face adapted for releasably engaging an outer surface of the inside compartment wall adjacent the second top lateral opening for retaining one of the hardtops within the second bag compartment.

According to yet another preferred embodiment of the invention, complementary fasteners are attached to the inner surface of the first closure flap and the outer surface of the first outside compartment wall for releasably engaging the inner surface of the first closure flap with the outer surface of the first outside compartment wall.

According to yet another preferred embodiment of the invention, complementary fasteners are attached to the inner surface of the second closure flap and the outer surface of the inside compartment wall for releasably engaging the inner surface of the second closure flap with the outer surface of the inside compartment wall.

The complementary fasteners preferably comprise patches of hook-and-loop material.

According to yet another preferred embodiment of the invention, the inside compartment wall defines a first pair of spaced-apart holes adjacent the bottom edge, and the second outside compartment wall defines second pair of spaced-apart holes adjacent the second closure flap. Each of the holes is adapted for receiving a respective one of the floor mounts of the automobile therethrough for securing the bag within an interior storage area of the automobile.

According to yet another preferred embodiment of the invention, the first bag compartment is offset from the second bag compartment, thereby offsetting the respective first and second lateral openings for permitting both of the hardtops of the automobile to be received in a respective one of the first and second bag compartments for being simultaneously stored within the interior storage area of the automobile.

According to yet another preferred embodiment of the invention, the inside compartment wall, the first and second closure flaps, and the first and second outside compartment walls each comprise a flexible sheet of multi-layered, durable material.

According to yet another preferred embodiment of the invention, the durable material is fabricated of an outer leather layer, an inner felt layer, and a protective flexible foam layer positioned between the outer leather layer and the inner felt layer for cushioning the hardtops stored within the first and second bag compartments.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
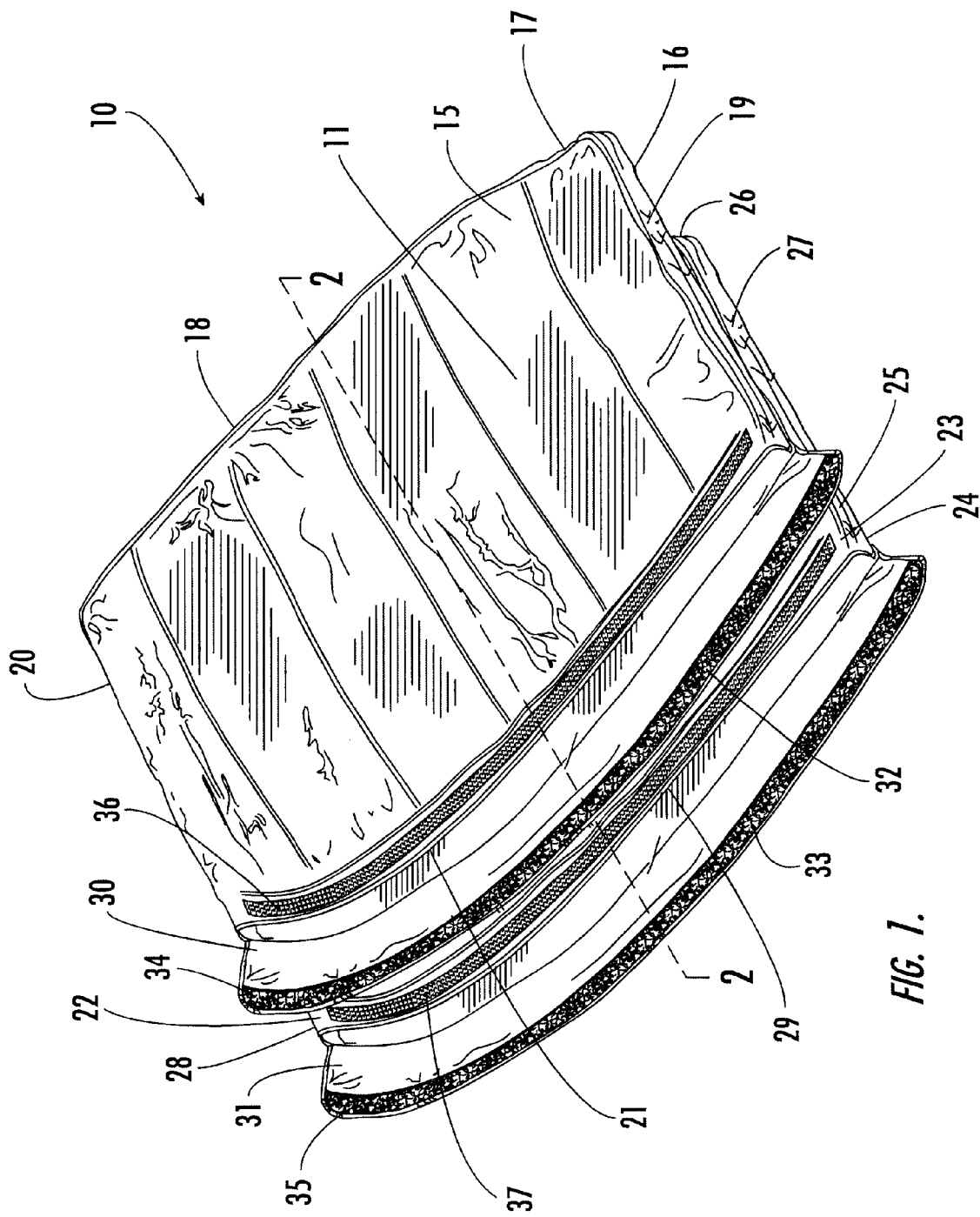
FIG. 1 is a perspective view of a protective bag according to one preferred embodiment of the invention with the closure flaps in an open position.

Referring now specifically to the drawings, a protective bag for use in storing one or both hardtops of a coupe top automobile according to the present invention is illustrated in FIG. 1 and shown generally at reference numeral 10. While the bag 10 may be used to store one or both hardtops of any suitable coupe top automobile, the bag 10 is preferably intended for use with the 1997, 1998, 1999, 2000, 2001, 2002, or 2003 C5 Model Corvette Coupes which are manufactured and sold by General Motors, Inc. The bag 10 includes a first bag compartment 11 defined by overlying first exterior and interior walls 15 and 16, respectively, joined together at a seam 17 along respective bottom and opposing side edges to form a first closed end 18, opposing closed side edges 19 and 20, and a first opening 21. Opening 21 extends between side edges 19 and 20, and communicates with the interior of compartment 11 for receiving a hardtop (not shown) therein for storage. A second bag compartment 22 is attached to the first bag compartment 11, and is defined by overlying second interior and exterior walls 23 and 24, respectively, which are joined together at a seam 25. Seam 25 is stitched along respective bottom and opposing side edges of walls 23 and 24 to form a second closed end 26, and second closed side edges 27 and 28. A second opening 29 extends between side edges 27 and 28, and communicates with the interior of compartment 22 for receiving a second hardtop for storage. As discussed in detail below, the bag 10 is preferably formed from a multi-layer, durable fabric material.

Figure 2:
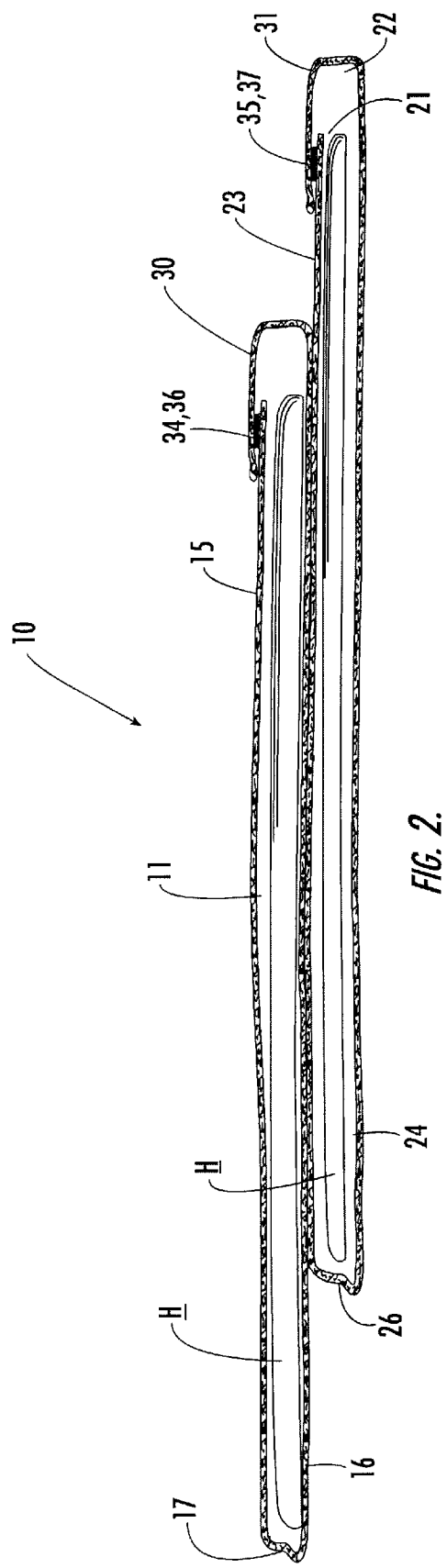
FIG. 2 is a cross-sectional side view of the protective bag taken along Line 2—2 of FIG. 1 and showing a hardtop positioned inside each of the bag compartments.

As is shown in FIGS. 1 and 2, bag compartment 11 is offset from bag compartment 22 so that the first closed end 18 and the first opening 21 are equally spaced apart from the second closed end 26 and the second opening 29, respectively. Bag compartments 11 and 22 are attached to each other by connecting the first and second interior walls 16 and 23, respectively, together by sewing, double stitching, using a suitable adhesive, or the like. Positioning the compartments 11 and 22 offset relative to one another and connecting the interior walls 16 and 23 together in this manner permits the bag 10 to be installed inside the storage compartment of the vehicle with two hardtops simultaneously stored within the bag 10, thus sparing one of the hardtops the risk of being damaged or destroyed as a result of being stored in an unprotected location.

Although a hardtop may be stored inside each of the respective compartments 11 and 22 without closing or otherwise protecting the openings 21 and 29, as is shown in FIG. 1, the bag 10 preferably includes closure flaps 30 and 31. Closure flaps 30 and 31 are elongate strips that are integrally formed with first interior wall 16 and second exterior wall 23, respectively. Closure flaps 30 and 31 include respective ends 32 and 33 which extend past respective openings 21 and 29. Strips 34 and 35 of male or female hook-and-loop material are sewn or otherwise secured onto the inside of closure flaps 30 and 31 along respective ends 32 and 33. Strips 36 and 37 of male or female hook and loop material complementary to strips 34 and 35 are sewn or otherwise attached to the first exterior wall 15 and second interior wall 23, respectively. FIG. 2 shows the bag 10 with complementary strips 34 and 36, and strips 35 and 37, cooperating with one another to close respective openings 21 and 29, thereby securing a respective one of two hardtops "H" inside each of the compartments 11 and 22.

Figure 3:
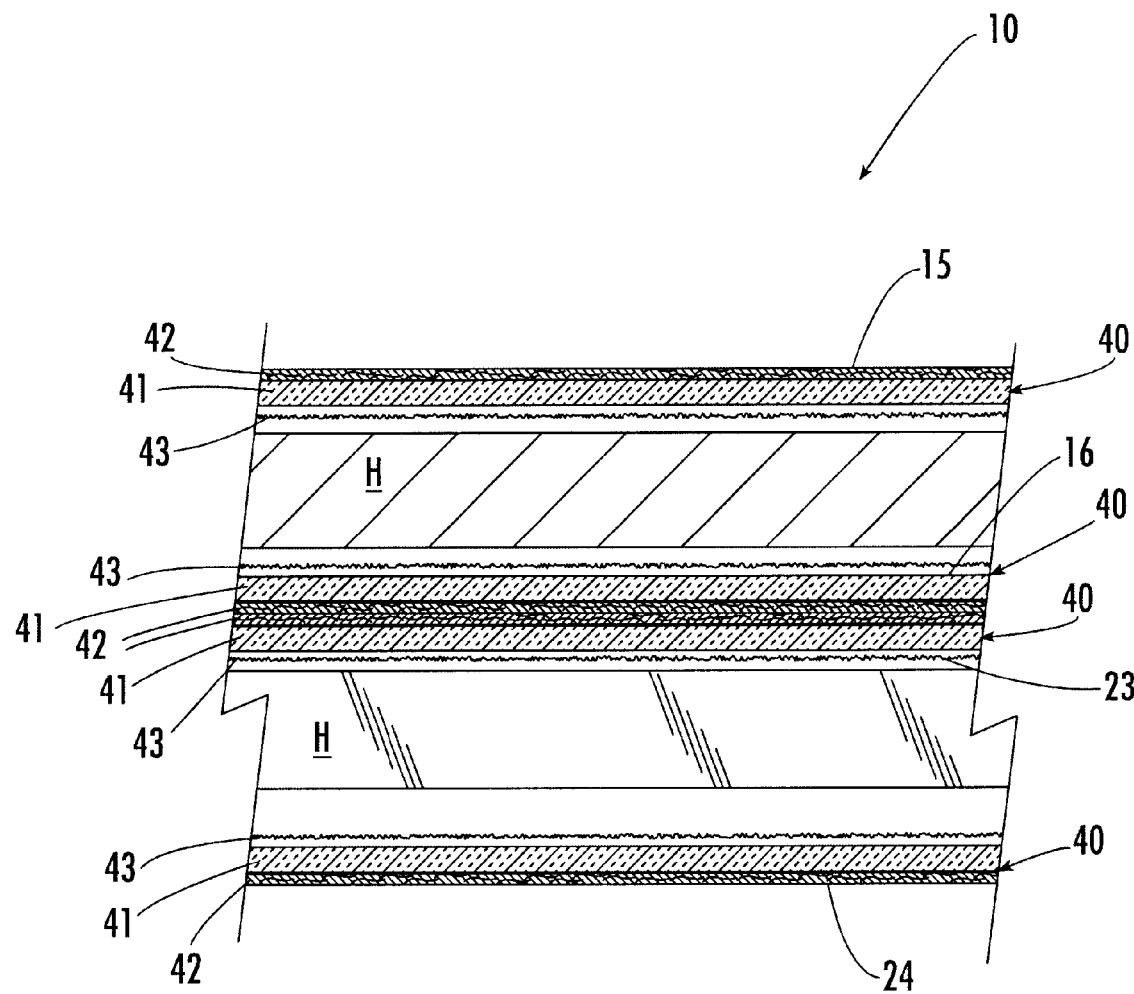
FIG. 3 is a fragmentary, enlarged cross-sectional view of FIG. 2, illustrating the construction of the multi-layered material from which the protective bag is formed.

Referring now to FIG. 3, while the bag of the present application may be formed from any suitable material, each of the walls 15, 16, 23 and 24, and the closure flaps 30 and 31 (not shown) of the bag 10 are preferably formed from a multi-layered, durable material 40 which is flexible enough to permit the bag 10 to be conveniently folded and stored in a compact location when not in use. Specifically, the material 40 is formed of a flexible foam layer 41 positioned between a leather layer 42 and a felt layer 43. The foam layer 41 may be of any thickness, but is preferably at least ¼" thick for providing extra padding and protection to the hardtops "H" stored inside the bag 10. As is shown in FIG. 3, the material 40 used to form the first and second exterior walls 15 and 24, respectively, is positioned so that the leather layer 42 extends outwardly away from the hardtops "H", and so that the felt layer 43 can engage the surfaces of the hardtops "H". Likewise, the material used to form the first and second interior walls 16 and 23 is positioned with the leather layers 42 attached to one another, and the felt layers 43 positioned next to the hardtops "H". The felt layers 43 thus provide a soft inner liner for protecting the hardtops "H" against scratches or other minor surface damage, and the leather layer 42 provides a durable protective outer covering that resists punctures or tearing.

Figure 4:
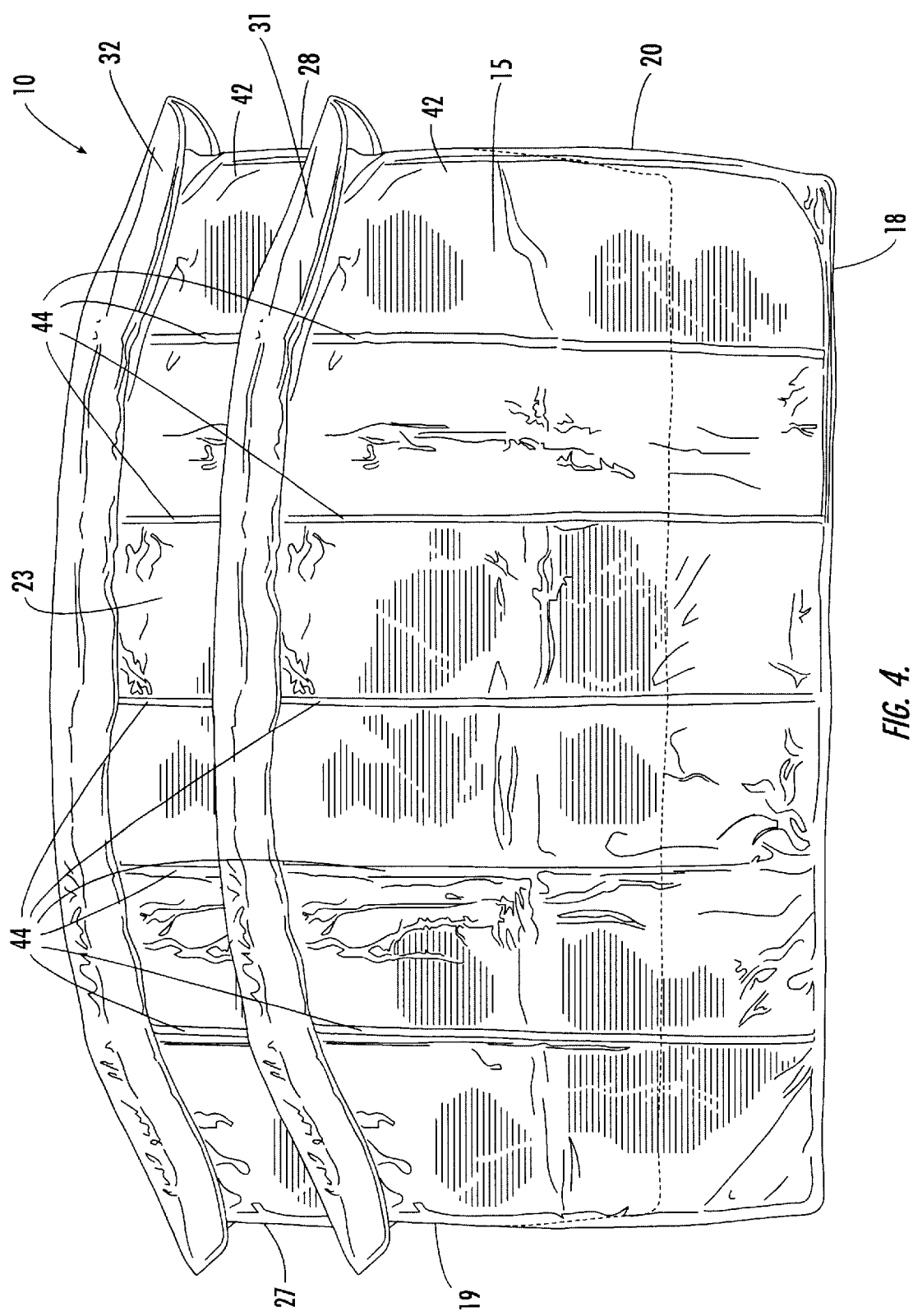
FIG. 4 is a top plan view of the protective bag with the closure flaps in a closed position.
Figure 5:
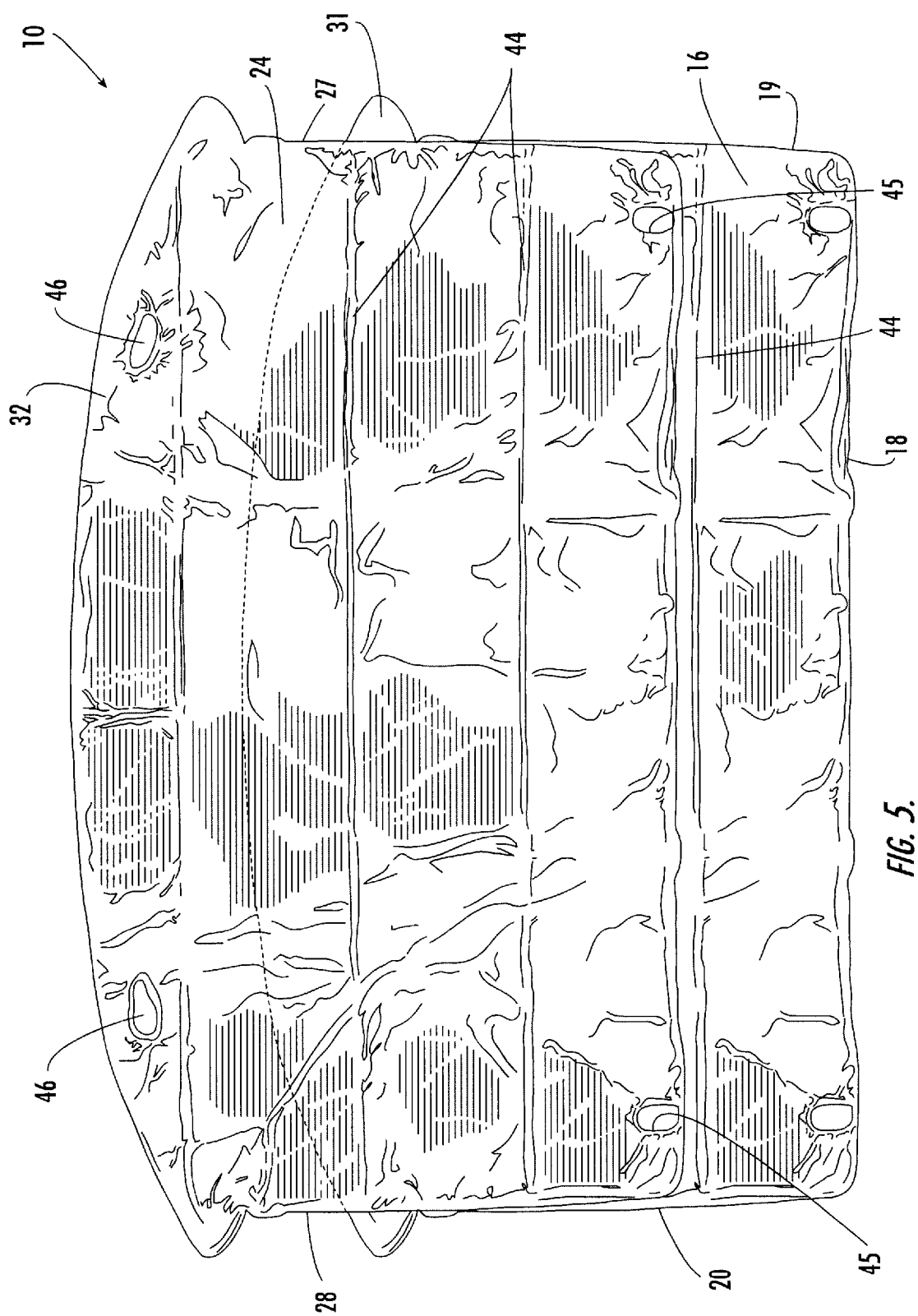
FIG. 5 is a bottom plan view of the protective bag, illustrating the placement of holes used for securing a hardtop within the storage compartment of a vehicle.

Referring now to FIG. 4, the bag 10 is shown with the flaps 31 and 32 closed against walls 15 and 23, respectively. The leather, foam and felt layers 41, 42 and 43 forming first exterior wall 15 and second interior wall 23 (layers 42 and 43 are not shown) are quilted together by a plurality of equally-spaced, straight seams 44 which prevent the layers 41, 42, and 43 from separating from one another. As is shown in FIG. 4, seams 44 extend parallel to side edges 19, 20, 27 and 28. In contrast, FIG. 5 shows the seams 44 extending laterally between side edges 19, 20, 27 and 28 for quilting the layers 41, 42 and 43 of the first interior wall 16 and the second exterior wall 24 together. As is shown in FIG. 5, the second exterior wall 24 defines two spaced-apart holes 45 which are positioned adjacent to the second closed end 26. As discussed more fully below, each hole 45 is adapted for receiving a respective one of two mount studs affixed to the floor of the interior storage compartment of the vehicle for securing a hardtop placed inside compartment 11 (not shown) to the vehicle floor. Second exterior wall 24 likewise defines two equally-spaced holes 46, each of which is positioned adjacent to the flap 32. Each hole 46 is adapted for receiving a respective one of two cover latches which are affixed to the side walls of the interior storage compartment of the vehicle for securing a hardtop placed inside compartment 22 within the storage compartment of the vehicle (not shown). Although they may be of any diameter, each hole 45 is preferably at least 2½" in diameter, and each hole 46 is preferably at least 2" in diameter.

Figure 6:
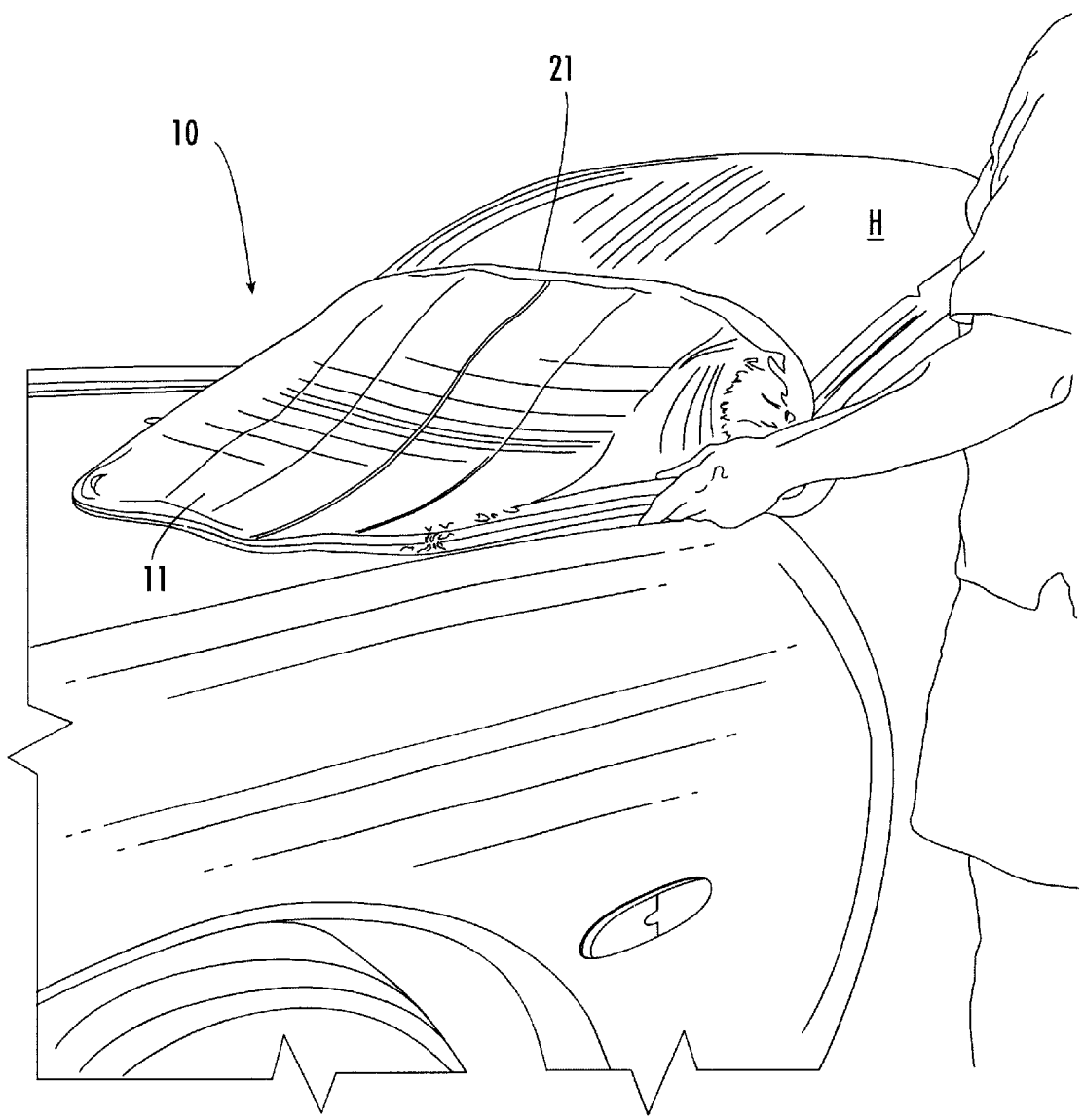
FIG. 6 is an environmental perspective view of a hardtop being inserted into the protective bag for placement within the storage compartment of the vehicle.
Figure 7:
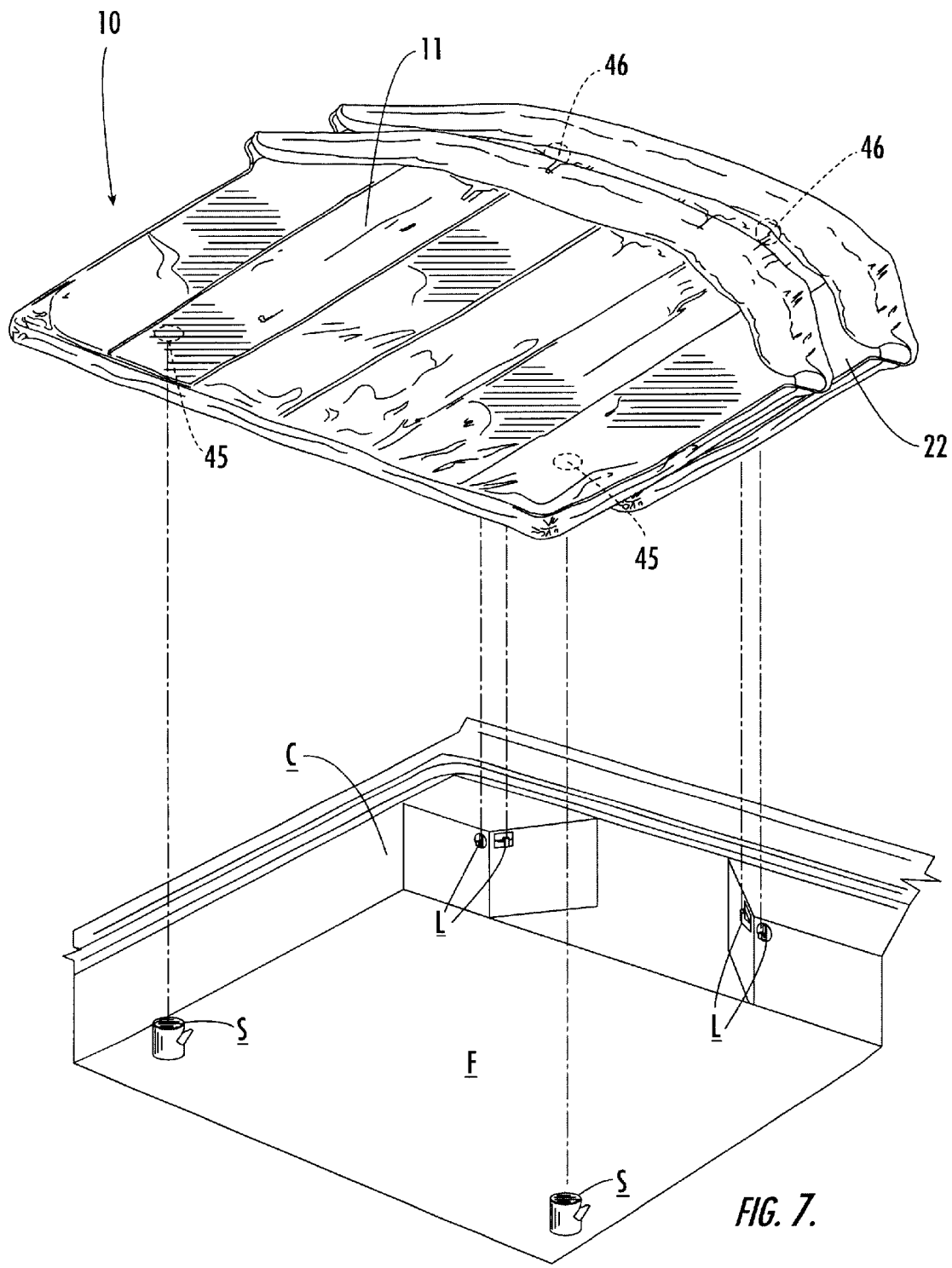
FIG. 7 is a fragmentary environmental perspective view of the protective bag during installation inside the storage compartment of a coupe top automobile.
Figure 8:
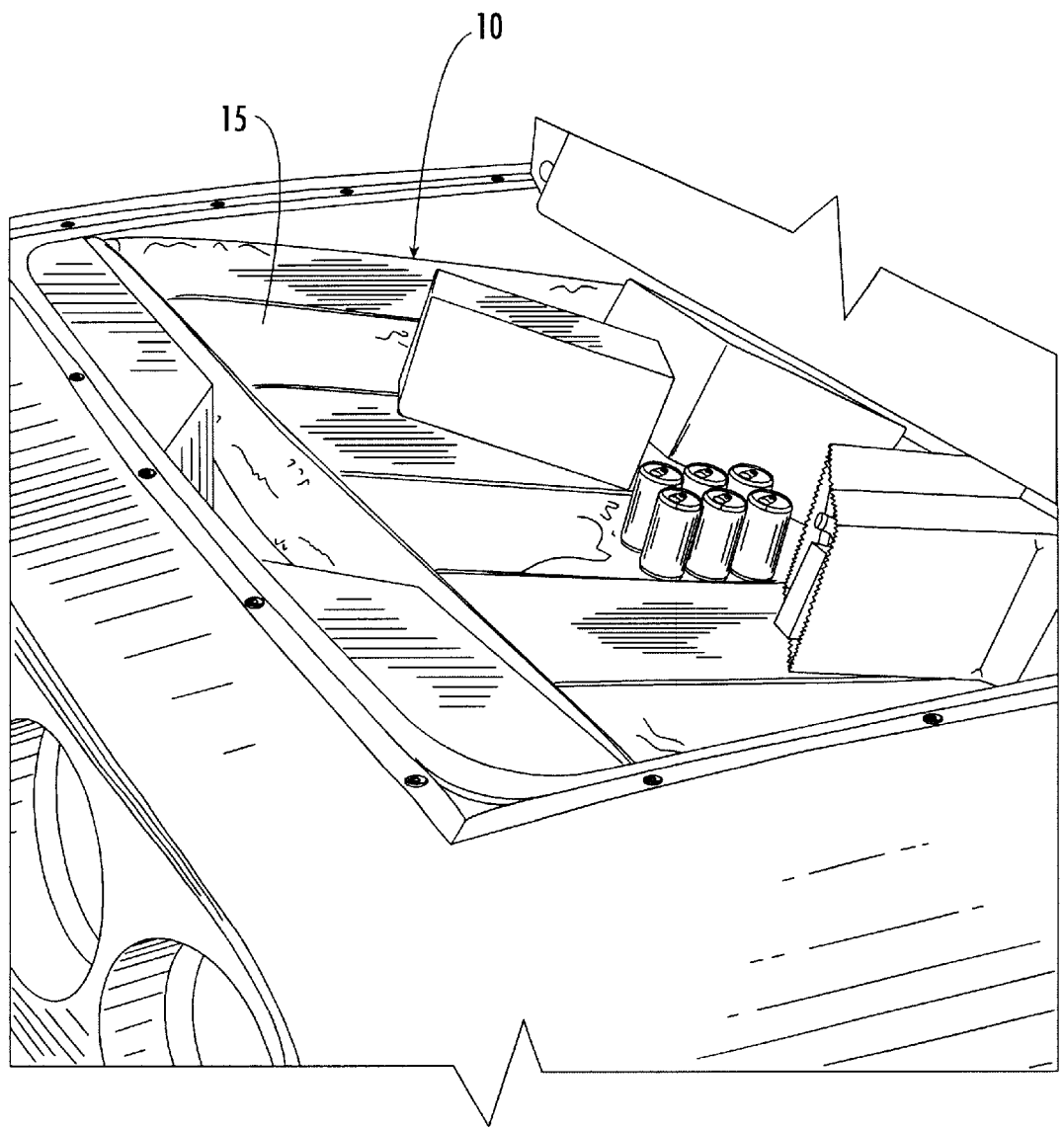
FIG. 8 is a fragmentary environmental perspective view of a the storage compartment of a coupe top automobile showing the protective bag installed inside the storage compartment.

Referring now to FIG. 6, a hardtop "H" is shown being positioned within the first opening 21 of the bag 10 and ready for insertion into the first storage compartment 11. FIG. 7 shows the bag 10 after a hardtop (not shown) has been inserted in each of the respective compartments 11 and 22, with the bag 10 positioned above and ready for loading into the interior storage compartment "C" of the vehicle. Note that the bag 10 is positioned above the floor "F" so that the openings 45 and 46 (shown drawn in phantom) are aligned with the floor mount studs "S" and cover latches "L" so that the hardtop stored inside compartment 22 may be attached thereto. FIG. 8 shows the bag 10 after installation inside the storage compartment, with groceries and other items resting directly on top of the first exterior wall 15. The multi-layered material 40 used to construct the bag 10 provides enough supplemental protection to the hardtops "H" stored inside (not shown) the bag 10 to permit heavy items, such as an unopened six-pack of soda cans, to be placed directly on top of the bag 10. Such items would damage a hardtop positioned inside the interior storage compartment without the protective benefits of the bag 10.

Figure 9:
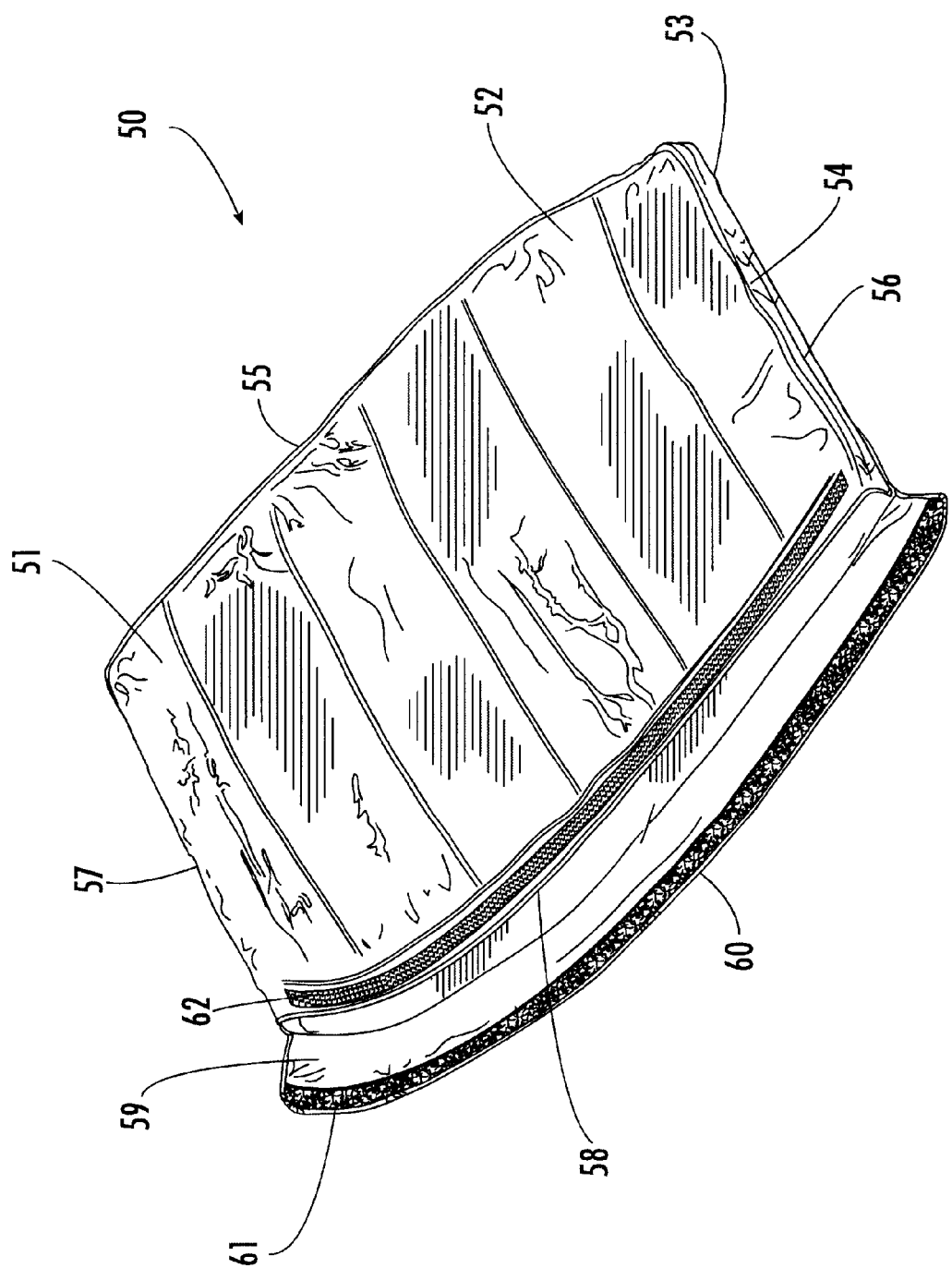
FIG. 9 is a perspective view of a protective bag according to another embodiment of the invention.

Referring now to FIG. 9, a protective bag for use in storing one hardtop of a coupe-top automobile according to another embodiment of the present invention is shown generally at reference numeral 50. Unlike bag 10, which includes two compartments for simultaneously storing two hardtops, the bag 50 is capable of storing only one hardtop at a time. The bag 50 includes a compartment 51 defined by overlying first and second walls 52 and 53, respectively, joined together by a seam 54 along respective bottom and opposing side edges to form a closed end 55, opposing closed side edges 56 and 57, and an opening 58. Opening 58 extends laterally between side edges 56 and 57, and communicates with the interior of compartment 51 for receiving a hardtop (not shown) therein.

The bag 50 includes a closure flap 59 which is integrally formed with second wall 53. Closure flap 59 extends laterally between side edges 56 and 57, and has an end 60 which extends beyond opening 58. A strip 61 of male or female hook-and-loop material is sewn or otherwise secured onto the inside of closure flap 59 adjacent the end 60. A complementary strip 62 of male or female hook and loop material is sewn or otherwise attached to the outside of first wall 52. In an alternative embodiment of the invention (not shown) the closure flap is integrally formed with the first wall instead of the second wall. The closure flap extends laterally between the side edges of the bag and has an end which extends past the opening of the bag. The closure flap is secured in a closed position using a strip of male or female hook-and-loop material secured onto the inside of the closure flap and a complementary strip of male or female hook-and-loop material sewn or otherwise attached to the outside of the second wall of the bag.

Figure 10:
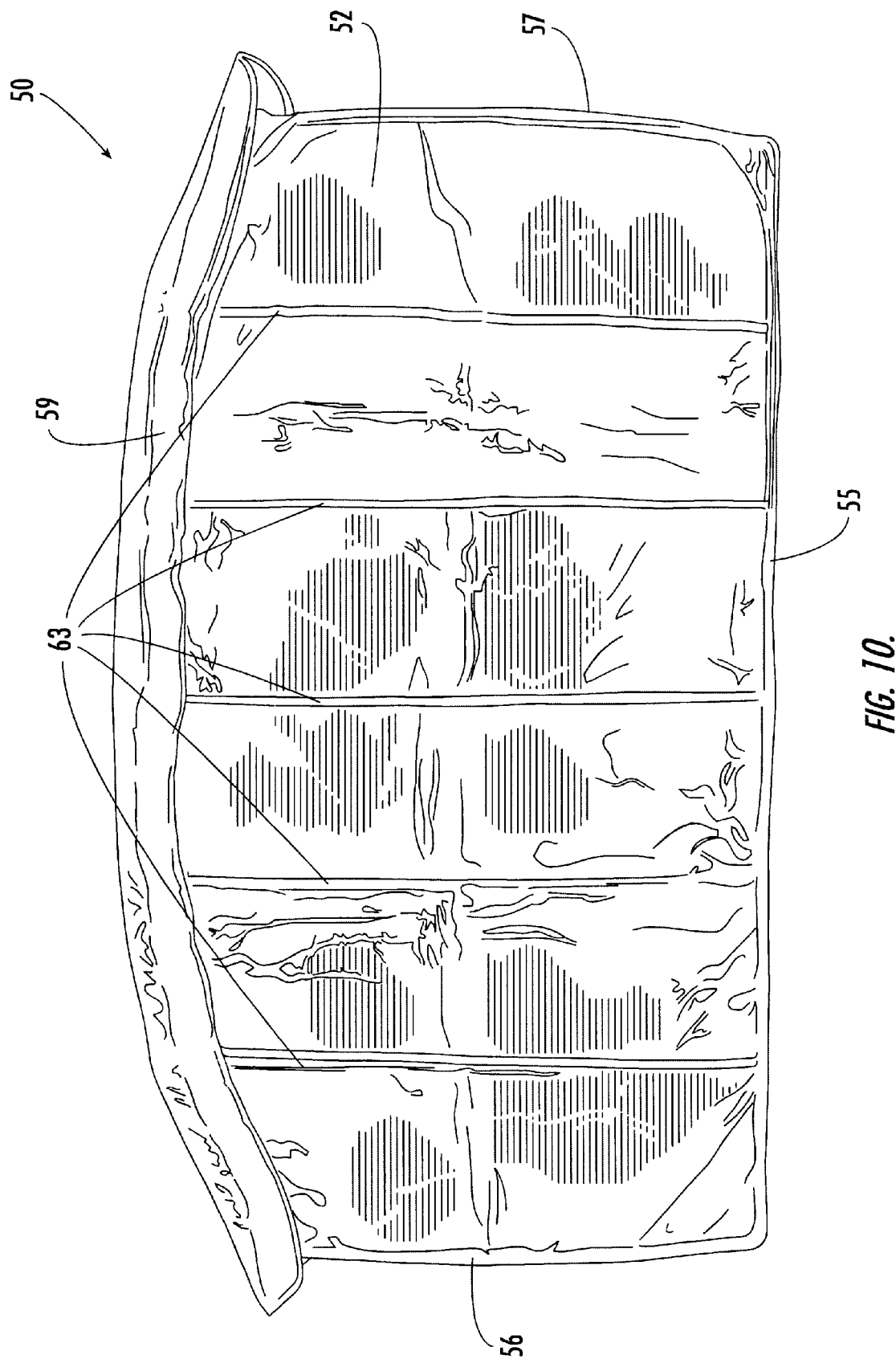
FIG. 10 is a top plan view of the protective bag shown in FIG. 6 with the closure flaps in a closed position.
Figure 11:
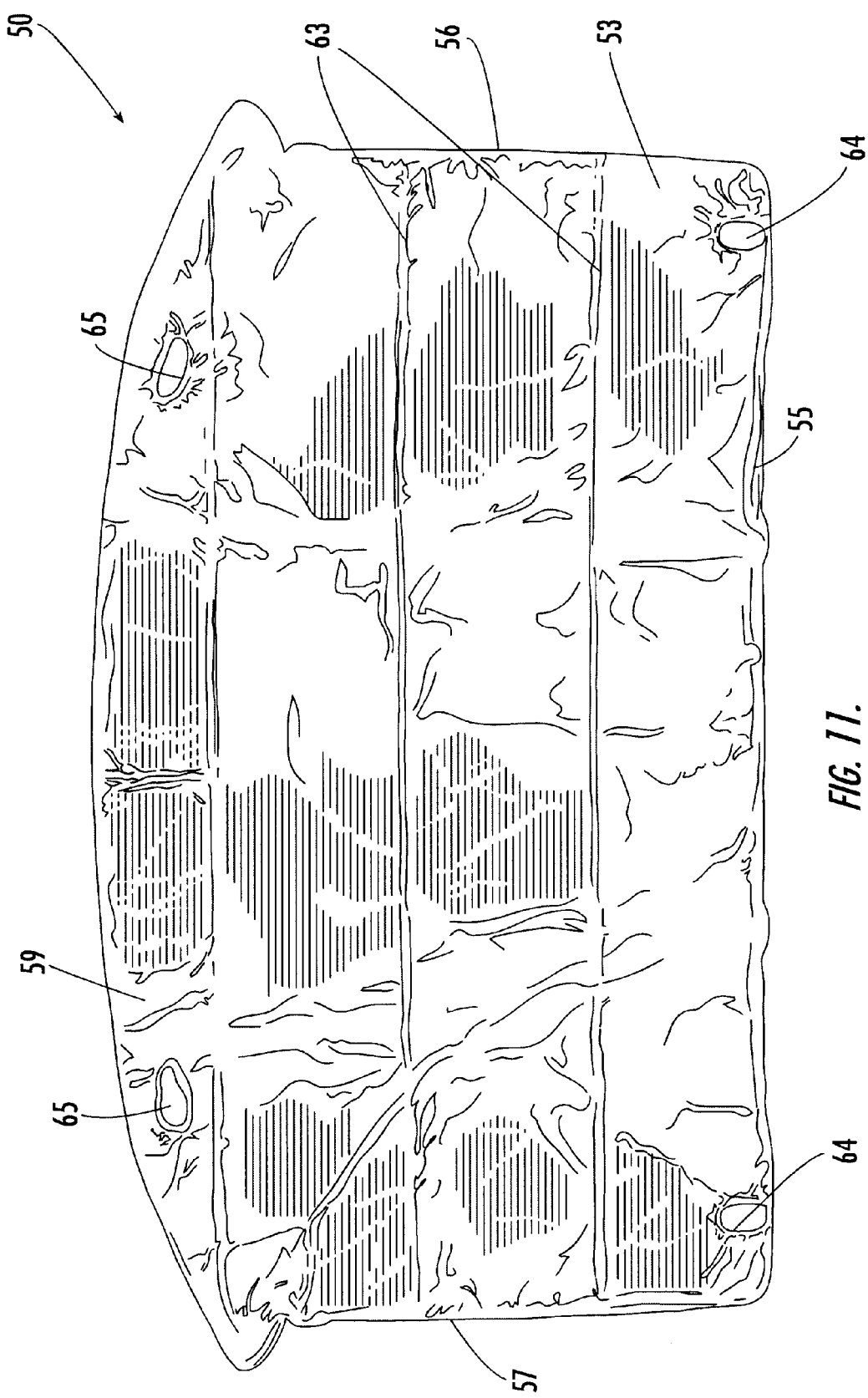
FIG. 11 is a bottom plan view of the protective bag shown in FIG. 6, illustrating the placement of holes used for securing a coupe hardtop within the storage compartment of a vehicle.

Referring now to FIGS. 10 and 11, the bag 50 is preferably formed from the same multi-layered, durable material as the bag 10. FIG. 10 shows the bag 50 with the closure flap 59 secured to the outside of first wall 52 in a closed position. Like the material used in the bag 10, the material used to form the bag 50 is quilted together by a plurality of equally-spaced, straight seams 63, each of which extends parallel to side edges 56 and 57 and between closed end 55 and the closure flap 59. In contrast, FIG. 11 shows the seams 63 stitched through the second wall 53 and extending laterally between side edges 56 and 57. As shown in FIG. 5, the second wall 53 defines two spaced-apart holes 64 which are positioned adjacent to the closed end 55. Each hole 64 is adapted for receiving a respective one of two mount studs affixed to the floor of the interior storage compartment of the vehicle for securing a hardtop placed inside compartment 51 (not shown) to the floor. Second wall 53 likewise defines two equally-spaced holes 65, each of which is positioned adjacent to the closure flap 59 for receiving a respective one of two cover latches of the vehicle for securing a hardtop placed inside compartment 51 inside the storage compartment of the vehicle. Although they may be of any diameter, each hole 64 is preferably at least 2½" in diameter, and each hole 65 is preferably at least 2" in diameter.

Figure 12:
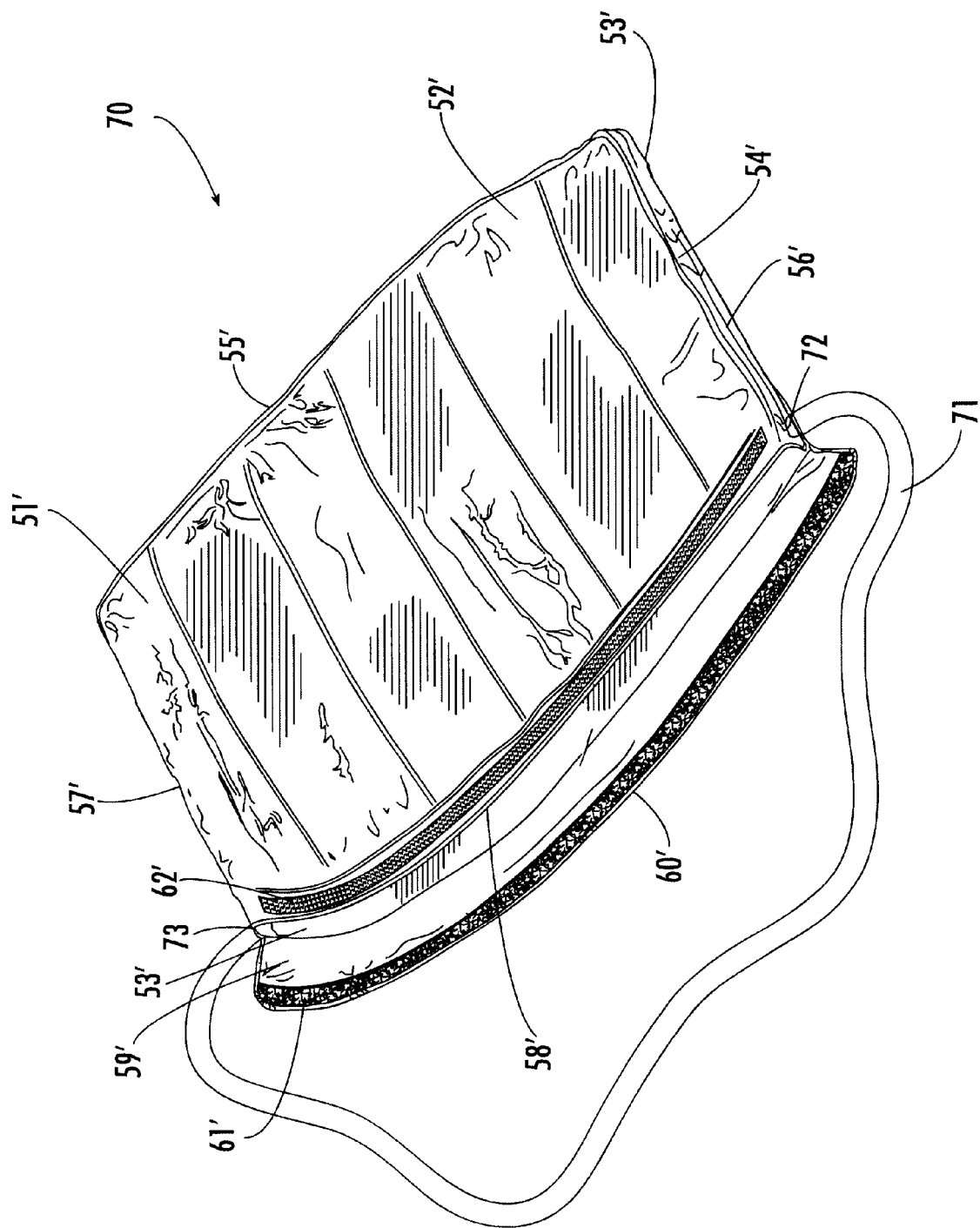
FIG. 12 is a perspective view of a protective bag according to another embodiment of the invention.

Referring now to FIG. 12, a protective bag according to another embodiment of the invention is shown generally at reference numeral 70. Components of bag 70 that are identical to those of bag 50 are indicated using prime numerals. The components, materials and function of the bag 70 are identical to the components, materials and function of bag 50, except that bag 70 also includes a elongate carrying strap 71. The strap 71 includes first and second ends 72 and 73 attached to side edges 56' and 57', respectively, adjacent to the opening 58'. The strap 71 is preferably formed from leather, and allows an individual to easily transport the bag 70 from one location to another. Although the strap 71 is shown in FIG. 12 permanently attached to the bag 70, the strap 70 may alternatively be releasably attached to the bag 50 using complementary male or female patches of hook-and-loop material, complementary metal or plastic latches, or any other suitable attachment device (not shown).

A multi-compartment bag for protecting and storing one or both of the hardtops of a coupe-top vehicle has been disclosed. Various details of the invention may be changed without departing from its scope. Furthermore, the foregoing description of the preferred embodiments of the invention and the best mode for practicing the invention are provided for the purpose of illustration only and not for the purpose of limitation—the invention being defined by the claims.

I claim:

1. A multi-compartment bag assembly for protecting and storing one or both hardtops of a coupe-top vehicle, said bag comprising:

(a) a first bag compartment defined by an overlying first outside compartment wall and an inside compartment wall joined along respective bottom and opposing side edges and including a first top lateral opening adapted for receiving at least one of the hardtops therein; and (b) a second bag compartment defined by said inside compartment wall and a second outside compartment wall, the inside compartment wall and said second outside compartment wall being joined along respective bottom and side edges and including a second top lateral opening adapted for receiving at least one of the hardtops therein, wherein said inside compartment wall defines a first pair of spaced-apart holes adjacent said bottom edge and the second outside compartment wall defines a second pair of spaced-apart holes adjacent the second closure flap, each of said holes adapted for receiving a respective one of the floor mounts of the automobile therethrough for securing said bag within an interior storage area of the automobile.

2. A bag assembly according to claim 1, and further comprising a first closure flap integrally formed with the inside compartment wall adjacent said first top lateral opening and extending outwardly therefrom between said side edges, said first closure flap including an inner face adapted for releasably engaging an outer surface of said first outside compartment wall adjacent the first top lateral opening for retaining one of the hardtops within said first bag compartment.

3. A bag assembly according to claim 2, wherein said bag assembly further comprises a second closure flap integrally formed with the second outside compartment wall adjacent said second top lateral opening and extending outwardly therefrom between said side edges, said second closure flap including an inner face adapted for releasably engaging an outer surface of the inside compartment wall adjacent the second top lateral opening for retaining one of the hardtops within said second bag compartment.

4. A bag according to claim 3, and including complementary fasteners attached to said inner surface of the first closure flap and said outer surface of the first outside compartment wall for releasably engaging the inner surface of the first closure flap with the outer surface of the first outside compartment wall.

5. A bag according to claim 4, and including complementary fasteners attached to said inner surface of the second closure flap and said outer surface of the inside compartment wall for releasably engaging the inner surface of the second closure flap with the outer surface of the inside compartment wall.

6. A bag according to claim 5, wherein said complementary fasteners comprise patches of hook-and-loop material.

7. A bag assembly according to claim 1, wherein said first bag compartment is offset from said second bag compartment, thereby offsetting the respective first and second lateral openings for permitting both of the hardtops of the automobile to be received in a respective one of the first and second bag compartments for being simultaneously stored within the interior storage area of the automobile.

8. A bag assembly according to claim 7, wherein said inside compartment wall and said first and second outside compartment walls each comprise a flexible sheet of multi-layered, durable material.

9. A bag according to claim 8, wherein said durable material is fabricated of an outer leather layer, an inner felt layer, and a protective flexible foam layer positioned between said outer leather layer and said inner felt layer for cushioning the hardtops stored within the first and second bag compartments.

* * * * *